US008987375B2

(12) United States Patent
Bushendorf et al.

(10) Patent No.: US 8,987,375 B2
(45) Date of Patent: Mar. 24, 2015

(54) POLYURETHANE FORMULATION WITH HIGH GREEN STRENGTH AND GUNNABILITY

(75) Inventors: Paula Bushendorf, Carver, MN (US); John M. Davis, Bloomington, MN (US); Michael Porsch, Saint Louis Park, MN (US)

(73) Assignee: Construction Research & Technology GmbH, Trostberg (DE)

( * ) Notice: Subject to any disclaimer, the term of this patent is extended or adjusted under 35 U.S.C. 154(b) by 323 days.

(21) Appl. No.: 13/498,042

(22) PCT Filed: Aug. 27, 2010

(86) PCT No.: PCT/EP2010/062551
§ 371 (c)(1),
(2), (4) Date: May 15, 2012

(87) PCT Pub. No.: WO2011/042255
PCT Pub. Date: Apr. 14, 2011

(65) Prior Publication Data
US 2012/0216952 A1    Aug. 30, 2012

Related U.S. Application Data

(60) Provisional application No. 61/248,690, filed on Oct. 5, 2009.

(51) Int. Cl.
| | |
|---|---|
| *B01F 17/00* | (2006.01) |
| *B32B 27/00* | (2006.01) |
| *B32B 27/40* | (2006.01) |
| *C08B 11/193* | (2006.01) |
| *C08F 2/38* | (2006.01) |
| *C08F 2/44* | (2006.01) |
| *C08F 8/30* | (2006.01) |
| *C08G 18/00* | (2006.01) |
| *C08G 18/08* | (2006.01) |
| *C08G 18/10* | (2006.01) |
| *C08G 18/16* | (2006.01) |

(Continued)

(52) U.S. Cl.
CPC . *C08K 5/21* (2013.01); *C08G 18/10* (2013.01); *C08G 18/2865* (2013.01); *C08G 18/7664* (2013.01); *C09J 175/04* (2013.01)
USPC ............ 524/590; 156/331.4; 156/331.7; 428/423.1; 524/43; 524/44; 524/211; 524/212; 524/507; 524/589; 524/718; 524/775; 524/788; 524/791; 524/849; 524/871; 524/872; 524/874; 524/875; 525/123; 525/455; 528/44; 528/49; 528/59; 528/85

(58) Field of Classification Search
CPC .......... B60J 1/006; B29C 65/484; C08F 2/44; C08G 18/00; C08G 18/06; C08G 18/08; C08G 18/0838; C08G 18/0857; C08G 18/10; C08G 18/12; C08G 18/3819; C08G 18/40; C08G 18/42; C08G 18/4623; C08G 18/44; C08G 18/48; C08G 18/5024; C08G 18/62; C08G 18/65; C08G 18/67; C08G 18/70; C08G 18/808; C08G 18/833; C08J 3/18; C08J 3/20; C08J 5/124; C08J 5/125; C08J 2375/04; C08J 2375/06; C08J 2375/08; C08J 2375/14; C08K 3/00; C08K 3/18; C08K 3/22; C08K 3/30; C08K 3/36; C08K 3/34; C08K 5/10; C08K 5/21; C08K 2300/00; C08L 75/04; C08L 75/06; C08L 75/08; C08L 75/12; C08L 75/14; C08L 2666/36; C08L 2666/68; C08L 2666/72
USPC ......... 524/211, 212, 507, 589, 590, 718, 775, 524/788, 791, 849, 871, 872, 874, 875, 43, 524/44; 528/44, 49, 59, 85; 156/331.4, 156/331.7; 428/423.1; 525/123, 455
See application file for complete search history.

(56) References Cited

U.S. PATENT DOCUMENTS

| | | | |
|---|---|---|---|
| 3,547,848 | A | 12/1970 | Marsh, et al. |
| 3,622,534 | A | 11/1971 | Timmons et al. |

(Continued)

FOREIGN PATENT DOCUMENTS

| | | |
|---|---|---|
| CA | 2 295 548 A1 | 1/2000 |
| DE | 2360019 A1 | 6/1974 |

(Continued)

OTHER PUBLICATIONS

Odian, George, "Principles of Polymerization", Third edition, 1991, pp. 19-24.*

(Continued)

*Primary Examiner* — Patrick Niland
(74) *Attorney, Agent, or Firm* — Curatolo Sidoti Co., LPA; Joseph G. Curatolo; Salvatore A. Sidoti

(57) ABSTRACT

A moisture-curable polyurethane formulation is provided capable of curing to form a reaction product, having high green strength and being dispensable from a caulking gun. The polyurethane formulation comprises at least one isocyanate-terminated prepolymer, at least one rheology modifier or filler, optionally monomeric/polymeric isocyanate, and at least one urea-based thixotropic additive added to the formulation or formed in situ, to provide greater than 1% of urea groups in the reaction product. A method for making a moisture-curable polyurethane formulation capable of curing to form a reaction product and methods of bonding materials together using the formulation are also provided.

31 Claims, No Drawings

(51) Int. Cl.
*C08G 18/28* (2006.01)
*C08G 18/48* (2006.01)
*C08L 1/26* (2006.01)
*C08L 75/00* (2006.01)
*C08K 3/00* (2006.01)
*C08K 3/34* (2006.01)
*C08K 5/00* (2006.01)
*C08K 5/09* (2006.01)
*C08K 5/34* (2006.01)
*C09J 4/00* (2006.01)
*C09J 101/00* (2006.01)
*C09J 201/00* (2006.01)
*C08F 283/04* (2006.01)
*C08K 5/21* (2006.01)
*C08G 18/76* (2006.01)
*C09J 175/04* (2006.01)

(56) References Cited

U.S. PATENT DOCUMENTS

| | | | |
|---|---|---|---|
| 3,893,956 A | 7/1975 | Brandt | |
| 5,290,853 A | 3/1994 | Regan et al. | |
| 5,508,111 A | 4/1996 | Schmucker | |
| 6,548,593 B2 | 4/2003 | Merz et al. | |
| 6,642,305 B2 | 11/2003 | Van Heugten et al. | |
| 7,148,287 B2 * | 12/2006 | Gupta | 524/871 |
| 8,252,859 B2 | 8/2012 | Burckhardt | |
| 2002/0007003 A1 | 1/2002 | Merz et al. | |
| 2003/0070741 A1 | 4/2003 | Rosenberg et al. | |
| 2007/0066721 A1 | 3/2007 | Kramer et al. | |
| 2007/0251629 A1 | 11/2007 | Rosenberg et al. | |
| 2008/0139686 A1 | 6/2008 | Sugiyama et al. | |
| 2009/0092840 A1 | 4/2009 | Schlumph et al. | |

FOREIGN PATENT DOCUMENTS

| | | |
|---|---|---|
| DE | 211 689 A3 | 7/1984 |
| JP | 2002-012850 A | 1/2002 |
| WO | WO 99/02578 A1 | 1/1999 |
| WO | WO 2009/010522 A1 | 1/2009 |

OTHER PUBLICATIONS

Office Action from corresponding Japanese Patent Application No. 2012-532514; mailed Feb. 3, 2014.
Office Action from corresponding Saudi Arabian Patent Application No. 110310737; mailed Feb. 27, 2014.
Office Action issued by EPO to European Patent Application No. 10 745 658.1, Apr. 8, 2013.
PCT/EP2010/062551—International Search Report, Oct. 8, 2010.
PCT/EP2010/062551—Written Opinion of the International Searching Authority, Oct. 8, 2010.
PCT/EP2010/062551—International Preliminary Report on Patentability, Apr. 11, 2012.
Canadian Office Action issued by CIPO to Canadian Patent Application No. 2,773,877, issued Aug. 22, 2013.
Canadian Office Action issued by CIPO to Canadian Patent Application No. 2,773,877, issued May 21, 2014.

* cited by examiner

POLYURETHANE FORMULATION WITH HIGH GREEN STRENGTH AND GUNNABILITY

CROSS REFERENCE TO RELATED APPLICATIONS

This application is a national stage application of International Application No. PCT/EP2010/062551, filed 27 Aug. 2010, which claims priority from U.S. Provisional Patent Application Ser. No. 61/248,690, filed 5 Oct. 2009, from which applications priority is claimed, and which are incorporated herein by reference.

Polyurethane materials demonstrate a unique combination of performance properties, including excellent abrasion resistance, flexibility, hardness, chemical resistance, solvent resistance, toughness, light stability, and weatherability.

The performance properties of polyurethanes make them suitable for many useful products, including foam insulation, coatings, thermoplastic molding materials, sealants and adhesive formulations, particularly moisture-curable formulations. It would be desirable to improve certain properties of polyurethane adhesive formulations, such as green strength and gunnability, in order to tailor the properties and performance of such formulations to particular end use applications. Green strength is the initial bond strength of the formulation before cure, i.e., prior to completion of the reaction with moisture. Gunnability is the ability to be dispensed in caulking guns from which the formulation may be quickly and easily gunned out and applied to a substrate.

A combination of high green strength, good adhesion, good flexibility, and ability to thin under high shear to permit gunnability has been difficult to achieve with moisture curable polyurethane formulations. It is desirable to increase the green strength of polyurethane formulations without raising their viscosity to undesirable levels or lowering their cold temperature flexibility. What is needed in the art are polyurethane formulations that are moisture-curable and achieve high green strength and gunnability without becoming too viscous for the application or without becoming too stiff for good wet out and good adhesion.

It is known to impart non-sag properties to polyurethane formulations by using low concentrations of urea compounds added to the polyurethane coating/adhesive or synthesized in situ. Sag resistant formulations can be applied to substrates in a vertical position without the formulation dripping or sagging before a second substrate is placed over the formulation. However, it was not previously known to significantly enhance the green strength and gunnability by providing higher concentrations of urea groups in the polyurethane formulation and by controlling the levels of free isocyanate monomer/polymer content in the reaction mixture.

A moisture-curable polyurethane formulation is provided with the properties of high green strength, good adhesion, and ability to thin under high shear to permit gunnability. The moisture-curable polyurethane formulation is capable of curing to form a reaction product, and comprises:

a) at least one isocyanate-terminated prepolymer which is the product of an isocyanate reactive compound and at least one monomeric/polymeric isocyanate, wherein sufficient monomeric/polymeric isocyanate is present to provide an excess of free isocyanate in the prepolymer and/or formulation, wherein the NCO/OH mole ratio of the prepolymer is within the range of about 5 to about 20;

b) optionally, additional monomeric/polymeric isocyanate;

c) at least one of:
   i) a urea-based thixotropic additive in the presence of a carrier, wherein the additive comprises about 4% to about 15% of urea groups and the reaction product comprises at least about 1% to about 5% urea groups; or
   ii) a urea-based thixotropic additive compound produced by the in situ reaction of the excess of free isocyanate in the isocyanate-terminated prepolymer or the additional monomeric/polymeric isocyanate with an aliphatic amine in the presence of a carrier and at sufficient concentration to provide greater than 1% of urea groups in the reaction product; and d) at least one rheology modifier or filler;

wherein the formulation is capable of being dispensed from a caulking gun and has sufficient green strength to adhesively bond a first substrate weighing at least 500 grams to a second substrate without the need for any holding instrument, wherein a contact surface between the first substrate and the second substrate is at least 18 inch$^2$. The formulation provides a green lap shear strength in excess of about 0.13 lbs/in$^2$ or greater, as measured by ASTM D 1002, which is incorporated herein by reference.

For purposes of illustration but not by way of limitation, the monomeric/polymeric isocyanate may comprise at least one of toluene diisocyanates, methylene diphenyl diisocyanates, phenylene diisocyanate, xylylene diisocyanate, diphenylmethane diisocyanate, polyphenylmethane polyisocyanate (Polymeric MDI), naphthalene diisocyanate, triphenylmethane triisocyanate, diphenyl sulfone diisocyanate, cyclohexane diisocyanates, ethylene diisocyanate, propylene diisocyanate, tetramethylene diisocyanate, hexamethylene diisocyanates, isophorone diisocyanate, dimers and trimers of these diisocyanates or mixtures thereof.

In certain embodiments, the monomeric/polymeric isocyanate may comprise at least one of toluene 2,4-diisocyanate, toluene 2,6-diisocyanate, naphthylene 1,5-diisocyanate, 4,4'-methylene diphenyl diisocyanate, 2,4'-methylene diphenyl diisocyanate, 1-methyl-2,4-diisocyanatocyclohexane, 1-methyl-2,6-diisocyanatocyclohexane, cyclohexane-1,4-diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate; and 3,3'-dimethyl-diphenylmethane-4,4'-diisocyanate, dimers and trimers of these isocyanates and mixtures thereof.

Also for purposes of illustration but not by way of limitation, the isocyanate reactive compound may comprise at least one of acrylic polyols, polyester polyols, polyoxyalkylene polyols, urethane polyols, epoxy polyols and polycarbonate polyols, having at least two hydroxyl groups in the molecule, or combinations thereof.

In certain embodiments, at least one isocyanate-terminated prepolymer may be prepared which is the product of an isocyanate reactive compound and at least one monomeric/polymeric isocyanate, wherein sufficient monomeric/polymeric isocyanate is present to provide an excess of free isocyanate in the prepolymer and/or formulation, and wherein the NCO/OH mole ratio of the prepolymer is within the range of about 5 to about 20. In other embodiments, optionally, additional monomeric/polymeric isocyanate is added to increase the NCO/OH mole ratio. This mole ratio of about 5 to about 20 results in a prepolymer and/or formulation that contains an excess of free isocyanate, for the formation of a urea-based thixotropic additive compound in situ. The NCO/OH mole ratio may be confirmed or monitored by means of NCO number measurement, as measured by ASTM D-2572-80, which is incorporated herein by reference.

In certain embodiments, the number average molecular weight of the isocyanate-terminated prepolymer is from about 7000 to about 7600, based on GPC chromatograms.

The polyurethane formulation further comprises at least one urea-based thixotropic component which may be added or produced in situ. The urea-based thixotropic additive may comprise at least about 25% by weight of the reaction product.

In certain embodiments, a urea-based thixotropic additive is added in the presence of a carrier, wherein the additive comprises about 4% to about 15% of urea groups and the reaction product comprises at least about 1% to about 5% urea groups. In certain embodiments, the urea-based thixotropic additive may comprise about 4% to about 6% of urea groups and the reaction product may comprise at least about 1.8% to about 3% urea groups. In certain embodiments, the urea-based thixotropic additive of component c(i) comprises a paste formed by dispersing the urea-based thixotropic additive in a plasticizer. In certain embodiments, the urea-based thixotropic additive may comprise a HAT paste comprising about 15% to about 35% of a urea thixotrope and about 65% to about 85% phthalate plasticizer.

For purposes of illustration but not by way of limitation, the urea-based thixotropic additive may comprise the product of: polyisocyanates comprising at least one of toluene-2,4-diisocyanate, toluene-2,6-diisocyanate, 4,4'-methylene diphenyl diisocyanate, 2,4'-methylene diphenyl diisocyanate, 4,4'-dicyclohexylmethane diisocyanate, isophorone diisocyanate, or hexamethylene diisocyanate; allophanate, biuret, uretdione, isocyanurate or carbodiimide derivatives thereof, or mixtures thereof; and primary alkyl monoamines comprising at least one of linear or branched $C_{4-10}$ alkyl monoamines, or linear or branched $C_{1-4}$ alkoxy $C_{3-6}$ alkyl monoamines.

Reaction conditions for the polyisocyanate and monoamine are not limitative. For example, the polyisocyanate and monoamine may be subjected to a reaction under conventional conditions, by dissolving or dispersing in a carrier such as an ester plasticizer, which is inert to isocyanate, in a ratio of 1 to 1.3 (isocyanate group/amino group), to obtain a urea-based thixotropic additive where the reaction product comprises at least about 1% to about 5% urea groups.

In certain embodiments, a urea-based thixotropic additive compound may be produced by the in situ reaction of the excess of free isocyanate in the isocyanate-terminated prepolymer or additional monomeric/polymeric isocyanate in the formulation with an aliphatic amine in the presence of a carrier in the $NCO/NH_2$ equivalent ratio of at least 3 to provide greater than 1% of urea groups in the reaction product.

In certain embodiments, the amine comprises at least one of primary amines, secondary amines, saturated aliphatic amines, unsaturated aliphatic amines, alkoxy alkyl amines, alicyclic amines, aralkyl amines, or aromatic amines.

For purposes of illustration but not by way of limitation, the amine may comprise at least one of methylamine, ethylamine, propylamine, isopropylamine, butylamine, amylamine, hexylamine, dimethylamine, diethylamine, dipropylamine, diisopropylamine, dibutylamine, allylamine, diallylamine; cyclopropylamine, cyclobutylamine, cyclopentylamine, cyclohexylamine, aniline, diphenylamine, methylaniline, ethylaniline, toludine, xylidine, benzylamine, or naphthylamine.

In certain embodiments, the carrier may comprise at least one of plasticizer or polyol which is noncombustible, has a relatively low viscosity and is compatible with the urethane matrix. The plasticizer may comprise at least one of C4-C12 alkyl phthalate, adipate, azelainate, sebacate, sulfonate, trimellitate, phosphate, fumarate, or maleate ester or diester, or mixtures thereof.

For illustration purposes but not by way of limitation, the plasticizer may comprise at least one of diisooctyl phthalate, diisodecyl phthalate, dioctyl phthalate, 2-ethylhexyl phthalate, diisononyl phtalate, dibutyl phthalate, diheptyl phthalate, dioctyl adipate, 2-ethylhexyl adipate, diisononyl adipate, or diisodecyl adipate, di(2-ethylhexyl)azelainate, di(2-ethylhexyl)sebacate, phenyl alkylsulfonates, tri(2-ethylhexyl)trimellitate, triphenyl phosphate, tricresyl phosphate, trixylenyl phosphate, cresyl diphenyl phosphate, xylenyl diphenyl phosphate, butyl fumarate, bis(2-methylpropyl) fumarate, diisobutyl fumarate, or bis(2-ethylhexyl) fumarate, dimethyl maleate or diethyl maleate, or mixtures thereof.

In certain embodiments, the polyol may comprise at least one of acrylic polyols, polyester polyols, polyoxyalkylene polyols, urethane polyols, epoxy polyols and polycarbonate polyols, having at least two hydroxyl groups in the molecule, or combinations thereof.

Representative polyoxyalkylene polyols include polyethylene glycol, polypropylene glycol, polytetramethylene glycol, or polyether prepared by the copolymerization of a cyclic ether comprising at least one of ethylene oxide, propylene oxide, trimethylene oxide, tetrahydrofuran, or mixtures thereof with at least one aliphatic polyol comprising ethylene glycol, 1,3-butanediol, diethylene glycol, dipropylene glycol, 1,2-propylene glycol, 1,3-propylene glycol, 1,4-butylene glycol, or mixtures thereof.

For purposes of illustration but not by way of limitation, the polyester polyol may be prepared by (a) the reaction of a dicarboxylic acid or anhydride with an excess of a diol; (b) the reaction of a lactone with a diol; or (c) the esterification of a dicarboxylic acid comprising at least one of phthalic acid, isophthalic acid or terephthalic acid or mixtures thereof with polyol initiators comprising at least one of ethylene glycol, diethylene glycol, propylene glycol, dipropylene glycol, butanediol, polyethylene glycol, glycerin, pentanetriol, or mixtures thereof.

The polyurethane formulation comprises a rheology modifier to increase the viscosity of the formulation immediately after application to a substrate. This can prevent the formulation from dripping or running when initially applied to a substrate. For illustration purposes but not by way of limitation, the rheology modifier comprises at least one of polyureas, fumed silica, hydroxyethyl cellulose, hydroxypropyl cellulose, polyamide waxes, modified castor oil, clay intercalated with organic cations, calcium carbonate, talc, acrylate polymers, PVC plastisols, polyurea-plasticizer dispersions, or mixtures thereof. Talc may be used as both a filler and rheology modifier.

Various fillers can be used in the polyurethane formulation, for example a solid that is inert to other materials in the formulation and reaction product. For purposes of illustration but not by way of limitation, the filler may comprise at least one of organic fibers, inorganic fibers, rubber particles, cork particles, carbon black, titanium dioxide, glass, crushed glass, glass spheres, iron particles, quartz, silica, amorphous precipitated silica, hydrophilic fumed silica, hydrophobic fumed silica, kaolin, mica, diatomaceous earth, talc, zeolites, clays, aluminum hydroxide, sulfates, aluminum sulfate, barium sulfate, calcium carbonate, dolomite, calcium sulfate, barites, limestone, wollastonite, perlite, flint powder, kryolite, alumina, alumina trihydrate, polymer granules, polymer powders, granulated or micronized polyethylene granulated or micronized polypropylene, melamine, polypropylene fibers, nylon fibers, zinc oxide, or mixtures thereof. Carbon black and titanium dioxide may be used as both a filler and a pigment.

The polyurethane formulation may comprise additional components which may include but are not limited to at least one of organic fillers, inorganic fillers, plasticizers, antioxidants, UV stabilizers, fungicides, mildewcides, biocides, fire retardants, surface additives, coloring agents, solvents, mineral oils, additional thixotropic agents, dispersing agents, adhesion promoters, catalysts, defoaming agents, storage stabilizers, latent hardeners, drying agents or mixtures thereof.

In one embodiment the total amount of such additives can be about 10 to about 75 weight percent; and in some embodiments about 25 to about 50 weight percent, based on the total weight of the polyurethane formulation.

By way of example, but not of limitation, the polyurethane formulation may contain from 0 to about 5 percent by weight of UV absorbers, from 0 to about 5 percent by weight of antioxidants, from 0 to about 2 percent by weight of mildewcides, from 0 to about 2 percent by weight of biocides, from 0 to about 2 percent by weight of fungicides, from 0 to about 40 percent by weight of fire or flame retardants, from 0 to about 30 percent by weight of pigments, from 0 to about 5 percent by weight of catalysts, from 0 to about 5 percent by weight of adhesion promoters, from 0 to about 10 percent by weight of flow and leveling additives, from 0 to about 5 percent by weight of wetting agents, from 0 to about 2 percent by weight of antifoaming agents, up to about 5 percent by weight of storage stabilizers, from 0 to about 10 percent by weight of latent hardeners, up to about 30 percent by weight of plasticizers, up to about 30 percent by weight of solvents, from about 0 to about 50 percent by weight of fillers, and/or from 1 to about 50 percent by weight of rheology modifiers Representative examples of fillers and plasticizers are enumerated above.

While not required, a plasticizer or solvent can be used to aid processing and/or as a diluent. In some embodiments the plasticizer can function both as a plasticizer and a solvent. In one embodiment the amount of plasticizer (solvent) may be up to about 30 weight percent. Suitable examples of solvents include, but are not limited to, aliphatic hydrocarbons such as mineral spirits, aromatic hydrocarbons such as toluene, xylene, solvent naphtha, and Aromatic 100, esters such as ethyl acetate, butyl acetate, and propylene glycol diacetate, ethers such as dipropylene glycol dimethyl ether, ketones such as methyl ethyl ketone, methyl isobutyl ketone, and cyclohexanone, and mixtures thereof.

Antioxidants, UV absorbers, stabilizers, mildewcides, biocides, and fungicides are materials known to those skilled in the art, and protect the polyurethane formulations from harmful effects of weathering and biological agents.

An antioxidant can be added to the polyurethane formulation to improve the long-term oxidation resistance of the polyurethane formulation. Antioxidants may comprise alkylated monophenols, alkylthiomethylphenols, hydroquinones and alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, benzylphosphonates, acylaminophenols, esters of beta-(3,5-di-tert-butyl-4-hydroxyphenyl)propionic acid with mono- or polyhydric alcohols, esters of beta-(5-tert-butyl-4-hydroxy-3-methylphenyl)propionic acid with mono- or polyhydric alcohols, esters of beta-(3,5-dicyclohexyl-4-hydroxyphenyl) propionic acid with mono- or polyhydric alcohols, esters of 3,5-di-tert-butyl-4-hydroxyphenyl acetic acid with mono- or polyhydric alcohols, amides of beta-(3,5-di-tert-butyl-4-hydroxyphenyl)propionic acid, ascorbic acid and derivatives, aminic antioxidants, and mixtures thereof. If used, the amount of antioxidant in one embodiment can be about 0.3 to about 1.0 weight percent, based on the total weight of the polyurethane formulation. Various commercially available antioxidants can be used, such as IRGANOX1076, an octadecyl 3,5-di-tert-butyl 4 hydroxyhydrocinnamate marketed by Ciba Corporation.

If included in the polyurethane formulation, UV stabilizers may comprise: 2-(2'-hydroxyphenyl)benzotriazoles; 2-hydroxybenzophenones; esters of substituted and unsubstituted benzoic acids; acrylates; nickel compounds; Hindered Amine Light Stabilizers ("HALS") such as bis(1,2,2,6,6-pentamethyl-4-piperidyl)sebacate+methyl 1,2,2,6,6-pentamethyl-4-piperidyl sebacate, bis(2,2,6,6-tetramethyl-4-piperidyl)sebacate, polymer of butanedioic acid dimethylester with 4-hydroxy-2,2,6,6-tetramethyl-1-piperidine ethanol, bis(1,2,2,6,6-pentamethyl-4-piperidinyl)-2-butyl-2-(4-hydroxy-3,5-di-tert-butylbenzyl)propanedioate; oxanilides; 2-(2-hydroxyphenyl)-1,3,5-triazines; and mixtures thereof.

Fungicides, mildewcides, and biocides if used in the polyurethane formulation may comprise 4,4-dimethyloxazolidine, 3,4,4-trimethyloxazolidine, modified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, copper 8-quinolinate, and mixtures thereof.

Fire retardants, if used in the polyurethane formulation, may comprise any material that provides self extinguishing properties. Examples of the fire retardant include, but are not limited to, phosphates such as triphenyl phosphate, polyammonium phosphate, monoammonium phosphate, or tri(2-chloroethyl) phosphate, exfoliated graphite, acid treated natural graphite flakes, and mixtures thereof. The fire retardant can be a liquid or a solid. A solid fire retardant may be ground to a micron size, typically referred to by those skilled in the art as micronized. Additionally, the fire retardant may include but is not limited to self extinguishing agents and flame retardants. In one embodiment, the fire retardant may be polyammonium phosphate. In another embodiment, aluminum oxide smoke retardant may be used in combination with polyammonium phosphate.

The polyurethane formulation may also comprise a coloring agent, such as a pigment or a dye, to provide a desired color to the formulation. Examples of coloring agents are carbon black and titanium dioxide which may be in the rutile form, but other coloring agents are also useful. Carbon black and titanium dioxide may act as both pigments and fillers in the formulation. Additional examples of pigments include, but are not limited to, barium sulfate, zinc oxide, zinc sulfide, basic lead carbonate, antimony trioxide, lithopones (zinc sulfide and barium sulfate), inorganic color pigments such as iron oxides, carbon black, graphite, luminescent pigments, zinc yellow, zinc green, ultramarine, manganese black, antimony black, manganese violet, Paris blue, and Schweinfurter green, organic color pigments such as sepia, gamboge, Cassel brown, toluidine red, para red, Hansa yellow, indigo, azo dyes, anthraquinonoid and indigoid dyes, as well as dioxazine, quinacridone, phthalocyanine, isoindolinone, and metal complex pigments, and mixtures thereof.

The polyurethane formulation may additionally comprise surface additives such as flow and leveling additives, wetting agents, and antifoaming agents to facilitate application of the material. Examples of flow and leveling additives, wetting agents, and antifoaming agents include silicones, modified silicones, polyacrylates, and hydrocarbons such as petroleum components and mixtures. Examples of suitable flow additives include, but are not limited to, polyester modified acrylic functional poly-di-methyl siloxanes such as BYK®-371, BYK® P-104, and polyacrylate copolymers such as BYK®-358, (all available from BYK-Chemie USA, Wallingford, Conn.), and fluorosurfactants such as 3M™ FLUORAD™ FC-4430 Fluorosurfactant (available from 3M Company, St. Paul, Minn.).

Adhesion promoters can also be used in the polyurethane formulation. Examples of adhesion promoters include, but are not limited to at least one of 2-aminoethyl-dimethyl-methoxysilane, 6-aminohexyl-tributoxysilane, 3-aminopropyl-trimethoxysilane, 3-aminopropyl-triethoxysilane, 3-aminopropyl-methyldimethoxysilane, 3-aminopropyl-methyldiethoxysilane, 5-aminopentyl-trimethoxysilane, 5-aminopentyl-triethoxysilane, 3-aminopropyl-triisopropoxysilane, γ-glycidoxypropyltrimethoxysilane, γ-glycidoxypropyltriethoxysilane, γ-mercaptopropyltrimethoxysilane, γ-mercaptopropyltriethoxysilane, γ-ureidopropyltrimethoxysilane, γ-ureidopropyltriethoxysilane, 1-[3-(trimethoxysilyl)propyl]urea, 1-[3-(triethoxysilyl)propyl]urea, [3-(2-aminoethylamino)propyl]trimethoxysilane, [3-(2-aminoethylamino)propyl]triethoxysilane, 2-(3,4-epoxycyclohexyl)ethyl-trimethoxysilane, 2-(3,4-epoxycyclohexyl)ethyl-triethoxysilane, 3-(phenylamino)propyl-trimethoxysilane, 3-(phenylamino)propyl-triethoxysilane, bis[3-(trimethoxysilyl)propyl]amine, bis[3-(triethoxysilyl)propyl]amine, 3-mercaptopropyl-methyldimethoxysilane, 3-mercaptopropyl-methyldiethoxysilane, [3-(2-aminoethylamino)propyl] methyl dimethoxysilane, [3-(2-aminoethylamino) propyl] methyl diethoxysilane, 3-glycidoxypropyl methyldimethoxysilane, or 3-glycidoxypropyl-methyldiethoxysilane, or combinations thereof.

One or more storage stabilizers can be used, including para toluene sulfonyl isocyanate ("PTSI"), benzoyl chloride, or phosphoric acid.

One or more latent hardeners which are inactive at room temperature but act as a curing agent at elevated temperatures can be used, including blocked amines.

One or more conventional catalysts which accelerate the isocyanate-polyol reaction can be used, including tertiary amines, organo metallic compounds or mixtures thereof.

Tertiary amines such as triethylenediamine, dimethylethanolamine, triethanolamine, N-ethyl morpholine, N-methyldicyclohexylamine, N,N-dimethyl cycolhexylamine, N,N,N', N'-tetramethyl-1,3-butanediamine, ether and the like can be used.

Organo metallic compounds such as tin compounds, such as stannous octoate, stannous chloride, dibutyltin dilaurate, dibutyltin diacetate, dibutyltin-di-2 ethyl hexoate and the like, or other suitable organo metallic compounds such as bismuth octoate, zinc octoate and the like can be used as catalysts.

The amount of catalysts, if used, may be in one embodiment about 0.01 to about 1 weight percent and in another embodiment about 0.03 to about 0.2 weight percent, based on the total weight of the formulation.

The additional polyurethane components may be incorporated separately or may be combined with any reaction component.

A method is provided for making a moisture-curable polyurethane formulation capable of curing to form a reaction product, comprising, providing components: a) at least one isocyanate-terminated prepolymer having an NCO/OH mole ratio within the range of about 5 to about 20; b) optionally additional monomeric/polymeric isocyanate; c) a thixotropic component comprising at least one of (i) a urea based thixotropic additive in the presence of a carrier, where the additive comprises at least about 4% of urea groups; or, (ii) a urea-based thixotropic additive compound produced by the in situ reaction of the excess of free isocyanate in the isocyanate-terminated prepolymer or the additional monomeric/polymeric isocyanate with an aliphatic amine in the presence of a carrier in sufficient mole ratio to provide greater than 1% of urea groups in a polyurethane reaction product; and, d) at least one rheology modifier or filler; wherein the formulation is capable of being dispensed from a caulking gun; and reacting the components a, optionally b, c(i) or c(ii) and d to form the reaction product comprising greater than 1% of urea groups. The reaction product has sufficient green strength to adhesively bond a first substrate weighing at least 500 grams to a second substrate without the need for any holding instrument, wherein a contact surface between the first substrate and the second substrate is at least 18 inch$^2$ and which provides a green lap shear strength in excess of about 0.13 lbs/in$^2$ or greater.

The components may be mixed by conventional or other means, preferably in an inert, dry atmosphere. The components may be mixed together all at one time (in a "one stage" process); alternatively, some components and/or portions of components may be mixed together in one operation (or "stage"), with other components and/or portions of components added in additional stage or stages. Normally, the components are heated above room temperature. The components may be heated before, during, or after the process of mixing. If more than one stage of addition of components and/or mixing and/or heating is used, the mixture of one stage may be heated for a time before the next stage is added. Preferred temperature of heating is 35° C. to 50° C. If more than one stage is used, the temperature of each stage may be chosen independently. During any of the mixing and/or heating stages, full or partial vacuum may be applied; also nitrogen gas or other dry and/or inert gas may be used to blanket the surface of the mixture. In addition, a catalyst may optionally be admixed with the components, either before, during, or after any one or more of the stages of mixing the components. The formulation is stored, preferably under an inert, dry atmosphere until use.

A method is provided of adhering a first substrate to a second substrate comprising applying the polyurethane formulation to a first substrate and contacting the polyurethane formulation-applied first substrate surface with the second substrate. The step of applying preferably comprises dispensing the polyurethane formulation from a caulking gun, but may also include spraying, brushing, rolling, squeegeeing, scraping, troweling, and combinations thereof.

The polyurethane formulation may be applied to a substrate, such as the surface of at least one of concrete, stone, metal, ceramic, glass, plastic, wood, asphalt, rubber or composite materials by techniques known in the art, prior to the cure of the formulation. The substrates to be bonded may be the same or different.

Improved performance is typically obtained for firm, clean and dry load bearing substrate surfaces free of loose and brittle particles, and without substances which impair adhe sion such as oil, grease, rubber skid marks, paint, or other contaminants. Surface preparation before application of the polyurethane formulation as a sealant or adhesive can include water-blasting, sandblasting, cleaning, drying and the like.

A method is further provided for bonding materials together which comprises applying the polyurethane formulation to a first substrate, bringing a second substrate in contact with the formulation applied to the first substrate, and subjecting the applied formulation to moisture which will allow the formulation to cure to an irreversible solid form. Moisture may take the form of ambient humidity, artificially increased or controlled humidified air, a mist of water droplets, a spray of liquid water contacting the applied formulation, or combinations thereof.

The following specific examples are given to illustrate the preparation of the polyurethane formulations as discussed above.

The green strength is the initial strength of the formulation immediately following application. Green strength is represented by demonstrating that the formulation possesses significant holding power as evidenced by passing the "Grab Test" and "Cure Test described below and by exhibiting "Gunnability" or extrudability, i.e., the ability to gun the formulation from a caulking gun cartridge.

In the Examples below, the following test procedures were used:

GRAB TEST: Three ¼ inch adhesive beads of the formulation were applied to four 4×4 inch ceramic stacked tiles weighing at least 500 grams and the stack of tiles were then attached to plywood without the need for any holding instrument. The contact surface (or overlap area) between the stacked tiles and the plywood was at least 18 inch$^2$. To pass the Grab Test, the formulation must be able to immediately hold a stack of four tiles weighing at least 500 grams on a vertical surface without the need for any holding instrument and without sliding or slipping.

CURE TEST: Curing conditions: 1 day at 75° F. and 50% relative humidity (RH). To pass the Cure Test, the formulation must be able to achieve full strength by lap-shear/t-bond on porous surfaces, according to ASTM D 1002.

GREEN STRENGTH: Test were performed within 30 minutes after adhesive is applied, namely for Lap Shear (ASTM D 1002) using a 1 inch$^2$ overlap and ⅛" thick adhesive layer.

GUNNABILITY: Gunnability or extrudaility was measured according to ASTM D-5267, which is incorporated herein by reference.

EXAMPLES

Examples 1-5

Polyurethane formulations were prepared including urea-based thixotropic additives (HAT paste) at high concentrations and the effect on gunnability and green strength was measured.

TABLE 1

| Component | Ex. 1 % | Ex. 2 % | Ex. 3 % | Ex. 4 % | Ex. 5 % |
|---|---|---|---|---|---|
| Urea-based Thixotropic HAT Paste[1] | 30 | 30 | 30 | 30 | 28.6 |
| Lupranate TF2115[2] | 30 | 0 | 0 | 0 | 0 |
| TDI[3] | 0 | 30 | 0 | 0 | 0 |
| Degaseal 55[4] | 0 | 0 | 30 | 50 | 57 |
| Supercoat[5] | 37 | 37.5 | 37.5 | 17 | 0 |
| Thixocarb 500 | 0 | 0 | 0 | 0 | 9.5 |
| Aerosil 200 | 3 | 2.5 | 2.5 | 3 | 4.9 |
| Total | 100 | 100 | 100 | 100 | 100 |
| Thixotropic index (visc @ 0.5 rpms/5 rpms) | 4.14 | 4.59 | 3.60 | 4.00 | 3.83 |
| Viscosity @ 0.5 rpms (Ps) | 58000 | 170000 | 144000 | 80000 | 11500 |
| Viscosity @ 5 rpms (Ps) | 14000 | 37000 | 40000 | 20000 | 30000 |
| Grab Test | Pass | Pass | Pass | Pass | Pass |
| Cure | Failed (too brittle) | Pass (elastomeric) | Pass | Pass | Pass |
| Gunnability | Pass | Pass | Pass | Pass | Pass |

[1]Urea-based Thixotropic HAT Paste contains 22% of a urea-based thixotropic additive and 78% of Dinonylphthalate as plasticizer. HAT Paste is the product of the reaction of MOPA with MDI in the presence of DINP (plasticizer).
[2]Lupranate ® TF 2115 Isocyanate is a low viscosity polymeric diphenylmethane diisocyanate (polymeric MDI) enriched with monomeric MDI, i.e., it is a mixture of polymeric and monomeric MDI, available from BASF.
[3]TDI is a toluene diisocyanate-based pre-polymer (NCO/OH = 1.7)
[4]Degaseal 55 is a polymeric MDI-based pre-polymer produced by BASF (NCO/OH = 9)
[5]Supercoat is stearic acid coated calcium carbonate from Imerys Procedure:

Components were mixed in a high speed mixer (Hauschild) for 2 intervals of 2.5 min at 2200 rpms. Viscosity and grab tests were performed after the product reached room temperature.

Grab Test 14 grams of adhesive are applied to the back of four 4×4 inch stacked ceramic tiles weighing at least 500 g. Immediately the stack of tiles is applied to a vertical plywood surface and held for 20 seconds before releasing while marking the initial height of the tiles on the plywood surface using a lab marker. After release, the stack of tiles should hold its position for at least five minutes.

Example 6

A polyurethane formulation was prepared with the In-Situ synthesis of a urea-based thixotropic additive compound.

TABLE 2

| Component | % |
|---|---|
| Diisononyl phthalate (DINP) plasticizer | 12.75 |
| Lupranate TF2115 Isocyanate[1] | 29.78 |
| Pluracol 1026[2] | 32.03 |
| MOPA (25% in DINP)[3] | 12.64 |
| Atomite[4] | 25.00 |
| Gray pigment[5] | 0.49 |
| Phosphoric acid 85% | 0.01 |
| DBTDL[6] | 0.04 |
| Total | 100.00 |
| Viscosity @ 5 rpm[7] (Ps) | 20000 |
| Appearance | Small grit |
| Thixotropic index (5/0.5 RPMs) | 3.5 |
| Grab Test | Pass |
| Gunnability | Pass |

[1]Prepolymer and Urea are formed in situ from the reaction of Lupranate RF2115 and Pluracol 1026 and Lupranate TF2115 and MOPA.
[2]Pluracol 1026 is a polyether polyol available from BASF.
[3]MOPA (25% in DINP) is methoxypropyl amine available from Sigma Aldrich.
[4]Atomite is ground calcium carbonate available from Imerys.
[5]Gray pigment is Pig alum gray 269 (carbon black, titanium dioxide and polyether polyols) available from BASF.
[6]DBTDL is Dibutyltin dilaurate added as catalyst available from Dura.
[7]Viscocity is measured at ambient temperature.

Procedure:

The prepolymer, DINP, urea, Lupranate TF2115, and Pluracol 1026 were combined in a reactor and the mixture heated up to 60° C. for 2 hours under Nitrogen using a planetary blade (1000 rpms). The NCO content was 14.4% by weight, as measured by ASTM D-2572. The reaction mixture was cooled down to room temperature, and then pumped into a reactor at a slow feed speed. Methoxypropylamine (MOPA 25% in DINP) was then added and the mixture reacted at room temperature and 2000 rpms (cowles)/1000 rpm (planetary) for 1.5 hours under Nitrogen. The NCO/OH content was 12.5 and free NCO content reached 10% by weight, as measured by ASTM D-2572. The reaction mixture was then transferred to a Ross mixer, and Atomite, Gray pigment, and Phosphoric Acid 85% were added and the mixture mixed at 3500 rpms under vacuum for 1 hour at room temperature. DBTDL catalyst was added and the mixture mixed for an additional 15 minutes. Green, Grab and Gunnability of the formulation were tested. The formulation had a viscosity of 20,000 centipoise at 25° C. as measured with a Brookfield Viscometer by using a helipath spindle at 5 rpm.

Examples 7-8

Preparation of Urea-Based Thixotropic Additive (Synthesis of HAT Paste PMDI)

TABLE 3

| Component | Example 7 | Example 8 (MOPA/DIOP Blend) |
|---|---|---|
| MDI 20[1] | 1230 g. | 1230 g. |
| MOPA | 270 g. | 540 g. (blend of MOPA and DIOP) |
| DIOP (moisture 0.024) | 270 g. | |
| Total | 1770 g. | 1770 g. |

[1]MDI 20 is methyl diphenyl diisocyanate available from BASF.

Procedure: 386 g. of the MOPA, DIOP 1:1 amine blend (270 g. of MOPA and 270 g. of DIOP) was combined with 1230 g of MDI 20 (for a total of 1,616 g.) and mixed with a cowls blade at 1000 rpm, sweep blade 500 rpm at 80° F. to obtain a HAT paste, which was collected and allowed to thicken. The paste was used as an adhesive for a stack of four ceramic tiles on Hardy board. No sliding was observed and the adhesive strength was good. The adhesive cured very brittle. Lap Shear was tested according to ASTM D 1002 using a 1 in.² overlap and ⅛ in. adhesive layer.

The results shown in the above Tables demonstrate gunnability and high green strength for subject formulations as measured by holding power demonstrated on the Grab Test and Cure Test.

It will be understood that the embodiment(s) described herein is/are merely exemplary, and that one skilled in the art may make variations and modifications without departing from the spirit and scope of the invention. All such variations and modifications are intended to be including within the scope of the invention as described hereinabove. Further, all embodiments disclosed are not necessarily in the alternative, as various embodiments of the invention may be combined to provide the desired result.

The invention claimed is:

1. A moisture-curable polyurethane formulation capable of curing to form a reaction product, and comprising:
    a) at least one isocyanate-terminated prepolymer which is the product of an isocyanate reactive compound and at least one monomeric/polymeric isocyanate, wherein sufficient monomeric/polymeric isocyanate is present to provide an excess of free isocyanate in the prepolymer and/or formulation, wherein the NCO/OH mole ratio of the prepolymer is within the range of about 5 to about 20;
    b) optionally, additional monomeric/polymeric isocyanate;
    c) at least one of:
        i) a urea-based thixotropic additive in the presence of a carrier, wherein the additive comprises about 4% to about 15% of urea groups and the reaction product comprises at least about 1% to about 5% urea groups; or
        ii) a urea-based thixotropic additive compound produced by the in situ reaction of the excess of free isocyanate in the isocyanate-terminated prepolymer or the additional monomeric/polymeric isocyanate with an amine in the presence of a carrier in a NCO/NH$_2$ equivalent ratio of at least 3 to provide greater than 1% of urea groups in the reaction product; and
    d) at least one rheology modifier or filler;
    wherein the formulation is capable of being dispensed from a caulking gun and has sufficient green strength to adhesively bond a first substrate weighing at least 500 grams to a second substrate without the need for any holding instrument, wherein a contact surface between the first substrate and the second substrate is at least 18 inch².

2. The polyurethane formulation of claim 1 wherein the urea-based thixotropic additive comprises about 4% to about 6% of urea groups and the reaction product comprises at least about 1.8% to about 3% urea groups.

3. The polyurethane formulation of claim 1, wherein the urea-based thixotropic additive of component c(i) comprises a paste formed by dispersing the urea-based thixotropic additive in a plasticizer.

4. The polyurethane formulation of claim 3, wherein the urea-based thixotropic additive comprises a paste comprising about 15% to about 35% of a urea thixotrope and about 65% to about 85% phthalate plasticizer.

5. The polyurethane formulation of claim 1, wherein the urea-based thixotropic additive comprises at least about 25% by weight of the reaction product.

6. The polyurethane formulation of claim 1, wherein the polyurethane formulation additionally comprises at least one of organic fillers, inorganic fillers, plasticizers, antioxidants, UV stabilizers, fungicides, mildewcides, biocides, fire retardants, surface additives, coloring agents, solvents, mineral oils, additional thixotropic agents, dispersing agents, adhesion promoters, catalysts, defoaming agents, drying agents or mixtures thereof.

7. The polyurethane formulation of claim 1, wherein the monomeric/polymeric isocyanate comprises at least one of toluene diisocyanates, methylene diphenyl diisocyanates, phenylene diisocyanate, xylylene diisocyanate, diphenylmethane diisocyanate, polyphenylmethane polyisocyanate (Polymeric MDI), naphthalene diisocyanate, triphenylmethane triisocyanate, diphenyl sulfone diisocyanate, cyclohexane diisocyanates, ethylene diisocyanate, propylene diisocyanate, tetramethylene diisocyanate, hexamethylene diisocyanates, isophorone diisocyanate, dimers and trimers of these diisocyanates or mixtures thereof.

8. The polyurethane formulation of claim 7, wherein the monomeric/polymeric isocyanate comprises at least one of toluene 2,4-diisocyanate, toluene 2,6-diisocyanate, naphthylene 1,5-diisocyanate, 4,4'-methylene diphenyl diisocyanate, 2,4'-methylene diphenyl diisocyanate, 1-methyl-2,4-diisocyanatocyclohexane, 1-methyl-2,6-diisocyanatocyclohexane, 4,4'-dicyclohexylmethane diisocyanate, urethodione diisocyanate, isocyanurate trisocyanate, cyclohexane-1,4-diisocyanate, 1-methoxyphenyl-2,4-diisocyanate, 4,4'-biphenylene diisocyanate, 3,3'-dimethoxy-4,4' biphenyl diisocyanate, 3,3'-dimethyl-4,4'-biphenyl diisocyanate, 3,3' dimethyldiphenylmethane-4,4'-diisocyanate, or mixtures thereof.

9. The polyurethane formulation of claim 1 wherein the isocyanate reactive compound comprises at least one of acrylic polyols, polyester polyols, polyoxyalkylene polyols, urethane polyols, epoxy polyols or polycarbonate polyols, having at least two hydroxyl groups in the molecule, or combinations thereof.

10. The polyurethane formulation of claim 1, wherein the amine comprises at least one of primary amines, secondary amines, saturated aliphatic amines, unsaturated aliphatic amines, alkoxy alkyl amines, alicyclic amines, aralkyl amines, aromatic amines, or mixtures thereof.

11. The polyurethane formulation of claim 1, wherein the amine comprises at least one of methylamine, ethylamine, propylamine, isopropylamine, butylamine, amylamine, hexylamine, dimethylamine, diethylamine, dipropylamine, diisopropylamine, dibutylamine, allylamine, diallylamine; cyclopropylamine, cyclobutylamine, cyclopentylamine, cyclohexylamine, aniline, diphenylamine, methylaniline, ethylaniline, toludine, xylidine, benzylamine, or naphthylamine.

12. The polyurethane formulation of claim 1 wherein the carrier comprises at least one of plasticizer or polyol.

13. The polyurethane formulation of claim 3 wherein the plasticizer comprises at least one of C4-C12 alkyl phthalate, adipate, azelainate, sebacate, sulfonate, trimellitate, phosphate, fumarate, or maleate ester or diester, or mixtures thereof.

14. The polyurethane formulation of claim 13 comprising at least one of diisooctyl phthalate, diisodecyl phthalate, dioctyl phthalate, 2-ethylhexyl phthalate, diisononyl phtalate, dibutyl phthalate, diheptyl phthalate, dioctyl adipate, 2-ethylhexyl adipate, diisononyl adipate, diisodecyl adipate, di(2-ethylhexyl)azelainate, di(2-ethylhexyl)sebacate, phenyl alkylsulfonates, tri(2-ethylhexyl)trimellitate, triphenyl phosphate, tricresyl phosphate, trixylenyl phosphate, cresyl diphenyl phosphate, xylenyl diphenyl phosphate, butyl fumarate, bis(2-methylpropyl) fumarate, diisobutyl fumarate, bis (2-ethylhexyl) fumarate, dimethyl maleate or diethyl maleate, or mixtures thereof.

15. The polyurethane formulation of claim 12 wherein the polyol comprises at least one of acrylic polyols, polyester polyols, polyoxyalkylene polyols, urethane polyols, epoxy polyols or polycarbonate polyols, having at least two hydroxyl groups in the molecule, or combinations thereof.

16. The polyurethane formulation of claim 9 wherein the at least one polyoxyalkylene polyol comprises at least one of polyethylene glycol; polypropylene glycol; polytetramethylene glycol; or polyether prepared by the copolymerization of a cyclic ether comprising at least one of ethylene oxide, propylene oxide, trimethylene oxide, tetrahydrofuran, or mixtures thereof with at least one aliphatic polyol comprising ethylene glycol, 1,3-butanediol, diethylene glycol, dipropylene glycol, 1,2-propylene glycol, 1,3-propylene glycol, 1,4-butylene glycol, or mixtures thereof.

17. The polyurethane formulation of claim 9 wherein the at least one polyester polyol is prepared by (a) the reaction of a dicarboxylic acid or anhydride with an excess of a diol; (b) the reaction of a lactone with a diol; or (c) the esterification of a dicarboxylic acid comprising at least one of phthalic acid, isophthalic acid or terephthalic acid or mixtures thereof with polyol initiators comprising at least one of ethylene glycol, diethylene glycol, propylene glycol, dipropylene glycol, butanediol, polyethylene glycol, glycerin, pentanetriol, or mixtures thereof.

18. The polyurethane formulation of claim 1 wherein the rheology modifier comprises at least one of polyureas, fumed silica, hydroxyethyl cellulose, hydroxypropyl cellulose, polyamide waxes, modified castor oil, clay intercalated with organic cations, or mixtures thereof.

19. The polyurethane formulation of claim 1 wherein the filler comprises at least one of organic fibers, inorganic fibers, rubber particles, cork particles, carbon black, titanium dioxide, glass, crushed glass, glass spheres, iron particles, quartz, silica, amorphous precipitated silica, hydrophilic fumed silica, hydrophobic fumed silica, kaolin, mica, diatomaceous earth, talc, zeolites, clays, aluminum hydroxide, sulfates, aluminum sulfate, barium sulfate, calcium carbonate, dolomite, calcium sulfate, barites, limestone, wollastonite, perlite, flint powder, kryolite, alumina, alumina trihydrate, polymer granules, polymer powders, granulated or micronized polyethylene, granulated or micronized polypropylene, melamine, polypropylene fibers, nylon fibers, zinc oxide, or mixtures thereof.

20. The polyurethane formulation of claim 1 wherein the urea-based thixotropic additive comprises the product of:
   polyisocyanates comprising at least one of toluene-2,4-diisocyanate, toluene-2,6-diisocyanate, 4,4'-methylene diphenyl diisocyanate, 2,4'-methylene diphenyl diisocyanate, 4,4'-dicyclohexylmethane diisocyanate, isophorone diisocyanate, or hexamethylene diisocyanate; allophanate, biuret, uretdione, isocyanurate or carbodiimide derivatives thereof, or mixtures thereof; and
   primary alkyl monoamines comprising at least one of linear or branched $C_{4-10}$ alkyl monoamines, or linear or branched C1 alkoxy $C_{3-6}$ alkyl monoamines.

21. The polyurethane formulation of claim 1 wherein the formulation provides a green lap shear strength in excess of about 0.13 lbs/in$^2$ or greater.

22. A method for making a moisture-curable polyurethane formulation capable of curing to form a reaction product, comprising:
provide components:
  a) at least one isocyanate-terminated prepolymer having an NCO/OH mole ratio within the range of about 5 to about 20;
  b) optionally additional monomeric/polymeric isocyanate;
  c) a thixotropic component comprising at least one of
    (i) a urea based thixotropic additive in the presence of a carrier, where the additive comprises at least about 4% of urea groups; or,
    (ii) a urea-based thixotropic additive compound produced by the in situ reaction of the excess of free isocyanate in the isocyanate-terminated prepolymer or the additional monomeric/polymeric isocyanate with an aliphatic amine in the presence of a carrier in a NCO/NH$_2$ equivalent ratio of at least 3 to provide greater than 1% of urea groups in a polyurethane reaction product; and,
  d) at least one rheology modifier or filler;
wherein the formulation is capable of being dispensed from a caulking gun; and
reacting the components a, optionally b, c(i) or c(ii) and d to form the reaction product comprising greater than 1% of urea groups;
wherein the reaction product has sufficient green strength to adhesively bond a first substrate weighing at least 500 grams to a second substrate without the need for any holding instrument, wherein a contact surface between the first substrate and the second substrate is at least 18 inch$^2$.

23. The method of claim 22, wherein the formulation provides a green lap shear strength in excess of about 0.13 lbs/in$^2$ or greater.

24. A method of adhering a first substrate to a second substrate comprising applying the polyurethane formulation of claim 1 to a first substrate and contacting the polyurethane formulation-applied first substrate surface with the second substrate.

25. The method of claim 24, wherein applying comprises dispensing the polyurethane formulation from a caulking gun.

26. The method of claim 24, wherein the first and second substrates comprise at least one of concrete, stone, metal, ceramic, glass, plastic, wood, asphalt, rubber or composite materials.

27. A method for bonding materials together which comprises applying the polyurethane formulation of claim 1 to a first substrate, bringing a second substrate in contact with the formulation applied to the first substrate, and subjecting the applied formulation to moisture which will allow the formulation to cure to an irreversible solid form.

28. The polyurethane formulation of claim 12 wherein the plasticizer comprises at least one of C4-C12 alkyl phthalate, adipate, azelainate, sebacate, sulfonate, trimellitate, phosphate, fumarate, or maleate ester or diester, or mixtures thereof.

29. The polyurethane formulation of claim 28 comprising at least one of diisooctyl phthalate, diisodecyl phthalate, dioctyl phthalate, 2-ethylhexyl phthalate, diisononyl phtalate, dibutyl phthalate, diheptyl phthalate, dioctyl adipate, 2-ethylhexyl adipate, diisononyl adipate, diisodecyl adipate, di(2-ethylhexyl)azelainate, di(2-ethylhexyl)sebacate, phenyl alkylsulfonates, tri(2-ethylhexyl)trimellitate, triphenyl phosphate, tricresyl phosphate, trixylenyl phosphate, cresyl diphenyl phosphate, xylenyl diphenyl phosphate, butyl fumarate, bis(2-methylpropyl) fumarate, diisobutyl fumarate, bis(2-ethylhexyl) fumarate, dimethyl maleate or diethyl maleate, or mixtures thereof.

30. The polyurethane formulation of claim 15 wherein the at least one polyoxyalkylene polyol comprises at least one of polyethylene glycol; polypropylene glycol; polytetramethylene glycol; or polyether prepared by the copolymerization of a cyclic ether comprising at least one of ethylene oxide, propylene oxide, trimethylene oxide, tetrahydrofuran, or mixtures thereof with at least one aliphatic polyol comprising ethylene glycol, 1,3-butanediol, diethylene glycol, dipropylene glycol, 1,2-propylene glycol, 1,3-propylene glycol, 1,4-butylene glycol, or mixtures thereof.

31. The polyurethane formulation of claim 15 wherein the at least one polyester polyol is prepared by (a) the reaction of a dicarboxylic acid or anhydride with an excess of a diol; (b) the reaction of a lactone with a diol; or (c) the esterification of a dicarboxylic acid comprising at least one of phthalic acid, isophthalic acid or terephthalic acid or mixtures thereof with polyol initiators comprising at least one of ethylene glycol, diethylene glycol, propylene glycol, dipropylene glycol, butanediol, polyethylene glycol, glycerin, pentanetriol, or mixtures thereof.

* * * * *